United States Patent [19]

Hiraishi

[11] Patent Number: 5,695,824
[45] Date of Patent: Dec. 9, 1997

[54] METHODS OF COATING HEAT AND OXIDATION RESISTANT COATING MATERIALS

[75] Inventor: Kunio Hiraishi, 7-22, 2-Chome, Miyanokawahara-Cho, Takatsuki-shi, Osaka, 569, Japan

[73] Assignees: Kunio Hiraishi; Trade Service Corporation, both of Osaka, Japan

[21] Appl. No.: 510,662

[22] Filed: Aug. 3, 1995

[30] Foreign Application Priority Data

Aug. 11, 1994 [JP] Japan ................... 6-189350

[51] Int. Cl.⁶ ............................................ B05D 3/02
[52] U.S. Cl. ............................. 427/376.1; 427/376.2; 427/376.3; 427/427
[58] Field of Search ...................... 427/376.1, 376.2, 427/376.3, 427

[56] References Cited

U.S. PATENT DOCUMENTS

| | | | |
|---|---|---|---|
| 3,895,136 | 7/1975 | Makishima et al. | 427/257 |
| 4,513,029 | 4/1985 | Sakai | 427/204 |
| 5,364,513 | 11/1994 | Sekhar et al. | 204/243 R |
| 5,512,316 | 4/1996 | Dody et al. | 427/140 |

*Primary Examiner*—Benjamin Utech
*Attorney, Agent, or Firm*—Oblon, Spivak, McClelland, Maier & Neustadt, P.C.

[57] ABSTRACT

A method of coating a heat and oxidation resistant material onto an object, where the material is sintered at a temperature lower than the melting point of the object and the sintering temperature of the material is reduced by admixture of a modifier to the coating composition.

12 Claims, No Drawings

METHODS OF COATING HEAT AND OXIDATION RESISTANT COATING MATERIALS

BACKGROUND OF THE INVENTION

1. Field of the Invention

The present invention concerns methods of coating heat and oxidation resistant coating materials which, by being coated and sintered onto the surface of an object to be treated, such as metals or firebricks, improve the resistance to heat, oxidation, wear, etc. of incinerators, boilers, heat exchangers, internal combustion engines, heat insulations for braking devices, etc. which use the abovementioned treated object.

2. Description of the Prior Art

By increasing the heat resistance of the parts of incinerators, boilers, internal combustion engines, heat exchangers, heat insulations for brake devices, etc., which are exposed to high temperatures, such equipment can be improved in operation rate and fuel consumption or be made to comply with environmental standards for gas emissions. Heat resistant materials which are used for this purpose include firebricks, heat resistant metals, ceramics, carbons, etc. Heat resistant materials have also been developed in which a ceramic material is sintered onto a metal.

However, though the abovementioned firebricks are excellent in heat resistance, they have a problem that powderization of the surface and joint parts are caused by thermal fluctuations. Furthermore, even with heat resistant metals, the heat resistance temperature is 1050° C. at the most and oxidation begins at temperatures above 800° C. Such heat resistant metals therefore cannot tolerate usage at ultrahigh temperatures. Heat resistance may be improved by coating the metal surface with a ceramic material. However, the tendency of ceramic materials to separate or crack due to differences in thermal expansion coefficients between the metal and ceramic remains to be an unsolved problem for such ceramic coatings. Furthermore, although ceramics and carbons are excellent in heat resistance, ceramics are weak to impact and difficult to manufacture in complex shapes while carbons have the problem of weight loss due to thermal oxidation.

SUMMARY OF THE INVENTION

The present invention was made to solve the abovementioned problems of the prior art. Thus the purpose of the present invention is to provide heat and oxidation resistant coating materials, which are applied to the surface of metals, firebricks, etc. to improve the resistance to heat and oxidation, and the coating methods for such coating materials.

The first invention adopted to achieve the above purpose is a method of coating a heat and oxidation resistant coating material wherein an aqueous solution is coated on a object to be treated, and sintered at a temperature lower than the melting point of the object, under the aqueous solution containing at least aluminum oxide, zirconium dioxide, silica, kaolinite, graphite, potassium silicate, and either an equivalent of tricobalt tetroxide, an equivalent of sodium borate, an equivalent of zinc oxide, or an equivalent of magnesium oxide.

A second invention is a method of coating a heat and oxidation resistant coating material wherein an aqueous solution is coated on a object to be treated, and sintered at a temperature lower than the melting point of the object, under the aqueous solution being prepared by mixing, at specific mixing ratios corresponding to the object, a powder prepared by blending ingredients, including at least aluminum oxide, zirconium dioxide, silica, kaolinite, graphite, and either an equivalent of tricobalt tetroxide, an equivalent of sodium borate, an equivalent of zinc oxide, or an equivalent of magnesium oxide, at specific blending ratios corresponding to the object, and an aqueous solution prepared by dissolving potassium silicate at a specific concentration corresponding to the object.

Tricobalt tetroxide, cobaltic oxide (I), cobaltic oxide (II), Raney cobalt, or manganese dioxide may be used individually or in combination as the abovementioned equivalent of tricobalt tetroxide.

Sodium borate, metaborate, pyroborate, borate, tetraborate, boron trioxide, sodium pentaborate, or ammonium borate may be used individually or in combination as the abovementioned equivalent of sodium borate.

Zinc hydroxide, zinc carbonate, lead sesquioxide, or lead silicate may be used individually or in combination as the abovementioned equivalent of zinc oxide.

Magnesium oxide, magnesium borate, magnesium sulfate, or magnesium fluoride may be used individually or in combination as the abovementioned equivalent of magnesium oxide.

In the abovementioned invention, high melting point materials, such as zirconium dioxide, aluminum oxide, and magnesium oxide, etc. may be melt at temperatures no higher than the melting point of the object to be treated, by blending auxiliaries which serve a catalytic function. Potassium silicate is prepared as an aqueous solution of a specific concentration and the powder materials are mixed with this solution. The coating material ingredients are thus put into a solution form to facilitate application onto the object. The potassium silicate itself also serves as an auxiliary for the formation of compounds of the powder materials. Furthermore, the coalescence with the object is improved and the object is made more resistant to oxidation by there being blended auxiliaries which provide the effects of making the coating material accommodate for the thermal expansion of the object and of restricting oxidation by heat.

Demonstration tests show that, by the present invention, objects to be treated and coating materials with different thermal expansion coefficients do not separate or crack at high temperatures or under sudden changes in temperature. Such results are assumed to be due to the following reason. That is, when a compound of the object and ceramic is formed by the interface of the molten coating material, numerous needle-like ceramic columns intrude into and bind with the object and a porous, stonewall-like condition is formed by inorganic materials comprised of particles of different sizes. The expansion of the object is absorbed and followed up by such conditions.

In order for the heat and oxidation resistant coating material with the above composition to be coated on a object, the coating material put into a solution form is applied to the surface of the object and sintered at temperatures no higher than the melting point of the object. Because the coating is provided in this manner, the degradation and thermal oxidation of firebricks, carbons, etc. is restricted and a heat resistant coating that will not separate or crack is provided on the metal surface.

Although the present specification concludes with the claims which particularly indicate and clearly claim the main topics of the present invention, the present invention shall be more clearly understood by the following description made with reference to the tables.

DETAILED DESCRIPTION OF THE PREFERRED EMBODIMENT

While only certain embodiments of the present invention have been described, it will be apparent to those skilled in the art that various changes and modifications may be made therein without departing from the spirit and scope of the present invention.

Tables 1 and 2 show blending ratios of the materials comprising the heat and oxidation resistant coating of the first and second embodiments of the present invention. These embodiments are exemplary compositions for forming a heat and oxidation resistant coating on the surface of iron materials (SS) and other related metals.

Tables 3 and 4 show blending ratios of the materials comprising the heat and oxidation resistant coating of the third and fourth embodiments of the present invention. These embodiments are exemplary compositions for forming a heat and oxidation resistant coating on the surface of stainless steel materials (SUS), nickel alloys, and other related metals.

The first to fourth embodiments are those for providing a heat resistant coating on the surface of a metal (object to be treated or the object) and the aluminum oxide, zirconium dioxide, kaolinite, and magnesium oxide, which comprise the coating material, serve as the main materials that form the heat resistant coat. Since the melting point of these heat resistant materials considerably exceed that of the metal, ferrosilicon, titanium dioxide, manganese dioxide, cobalt materials, etc. are blended as catalysts and auxiliaries for causing the above heat resistant materials to melt at temperatures no higher than the melting point of the metal. Auxiliaries such as silicon dioxide and graphite are also blended to provide a balance among materials so that the expansion of the metal will be absorbed and followed up after the heat resistant coat is formed on the metal surface. Furthermore, borate compounds, nickel compounds, and zinc compounds are blended to prevent oxidation due to heat at the bonding interface between the metal and the coat.

TABLE 1

| Name of Material (Chemical Symbol) | Form | Blending Ratio | Mixing Ratio |
|---|---|---|---|
| Ferrosilicon (FeSi$_3$) | Powder | 30% | 40% |
| Manganese dioxide (MnO$_2$) | " | 10% | |
| Aluminum oxide (Al$_2$O$_3$) | " | 20% | |
| Zirconium dioxide (ZrO$_2$) | " | 3% | |
| Silica (SiO$_2$) | " | 20% | |
| Kaolinite (Al$_2$O$_3$2SiO$_2$2H$_2$O) | " | 5% | |
| Tricobalt tetroxide (Co$_3$O$_4$) | " | 3% | |
| Titanium dioxide (TiO$_2$) | " | 5% | |
| Sodium tetraborate (Na$_2$B$_4$O$_7$) | " | 2% | |
| Heat resistant glass | " | 1% | |
| Graphite . . . JISR7201-72 | " | 1% | |
| Potassium silicate (K$_2$SiO$_2$) | Liquid | 100% 25–26 heavy Baume degree solution | 60% |

TABLE 2

| Name of Material (Chemical Symbol) | Form | Blending Ratio | Mixing Ratio |
|---|---|---|---|
| Ferrosilicon (FeSi$_3$) | Powder | 25% | 40% |
| Raney cobalt (CoO) | " | 18% | |

TABLE 2-continued

| Name of Material (Chemical Symbol) | Form | Blending Ratio | Mixing Ratio |
|---|---|---|---|
| Aluminum oxide (Al$_2$O$_3$) | " | 20% | |
| Zirconium dioxide (ZrO$_2$) | " | 5% | |
| Tricobalt tetroxide (Co$_3$O$_4$) | " | 5% | |
| Kaolinite (Al$_2$O$_3$2SiO$_2$2H$_2$O) | " | 5% | |
| Manganese dioxide (MnO$_2$) | " | 5% | |
| Silica (SiO$_2$) | " | 10% | |
| Sodium tetraborate (Na$_2$B$_4$O$_7$) | " | 1% | |
| Refractory mortar | " | 5% | |
| Graphite . . . JISR7201-72 | " | 1% | |
| Potassium silicate (K$_2$SiO$_2$) | Liquid | 100% 25–26 heavy Baume degree solution | 60% |

TABLE 3

| Name of Material (Chemical Symbol) | Form | Blending Ratio | Mixing Ratio |
|---|---|---|---|
| Magnesium oxide (MgO) | Powder | 7% | 30 to 40% |
| Aluminum oxide (Al$_2$O$_3$) | " | 24% | |
| Zirconium dioxide (ZrO$_2$)) | " | 5% | |
| Tricobalt tetroxide (Co$_3$O$_4$) | " | 4% | |
| Silica (SiO$_2$) | " | 22% | |
| Titanium dioxide (TiO$_2$) | " | 5% | |
| Kaolinite (Al$_2$O$_3$2SiO$_2$)2H$_2$O) | " | 5% | |
| Manganese dioxide (MnO$_2$) | " | 24% | |
| Aluminum silicate (Al$_2$O$_3$3SiO$_2$) | " | 1% | |
| Sodium borate (Na$_2$B$_4$O$_7$10H$_2$O) | " | 2% | |
| Graphite . . . JISR7201-72 | " | 1% | |
| Potassium silicate (K$_2$SiO$_2$) | Liquid | 100% 25–26 heavy Baume degree solution | 60 to 70% |

TABLE 4

| Name of Material (Chemical Symbol) | Form | Blending Ratio | Mixing Ratio |
|---|---|---|---|
| Magnesium oxide (MgO) | Powder | 10% | 30 to 40% |
| Aluminum oxide (Al$_2$O$_3$) | " | 25% | |
| Zirconium dioxide (ZrO$_2$) | " | 10% | |
| Silica (SiO$_2$) | " | 25% | |
| Titanium dioxide (TiO$_2$) | " | 7% | |
| Kaolinite (Al$_2$O$_3$2SiO$_2$2H$_2$O) | " | 10% | |
| Borosilicate glass powder (B$_2$O$_3$—SiO$_2$) | " | 5% | |
| Tricobalt tetroxide (Co$_3$O$_4$) | " | 5% | |
| Sodium borate (Na$_2$B$_4$O$_7$10H$_2$O) | " | 2% | |
| Graphite . . . JISR7201-72 | " | 1% | |
| Potassium silicate (K$_2$SiO$_2$) | Liquid | 100% 25–26 heavy Baume degree solution | 60 to 70% |

Among the comprising materials for which the blending ratios are shown in Tables 1–4, aluminum oxide, zirconium dioxide, silica, kaolinite, graphite, and potassium silicate are materials that cannot be replaced by other materials. Tricobalt tetroxide may be replaced by cobaltous oxide, cobaltic oxide, Raney cobalt, or manganese dioxide. Sodium tetraborate may be replaced by sodium borate, metaborate, sodium pyroborate, borate, tetraborate, boron trioxide, sodium pentaborate, or ammonium borate. Magnesium oxide may be replaced by magnesium borate, magnesium sulfate, or magnesium fluoride.

The powder materials shown in the Tables are blended at the respective blending ratios and then mixed with an aqueous potassium silicate of the designated concentration. That is, each of the coating materials for iron materials is prepared as a mixed coating material solution consisting of 40% powder material and 60% liquid material, while each of the coating materials for stainless steel materials is prepared as a mixed coating material solution consisting of 30–40% powder material and 60–70% liquid material. These coating material solutions are applied to the metal surface by such means as brush application, spray application, immersion, etc., and then baked at a temperature no higher than the melting point of the metal.

As the temperature rises during sintering, the catalysts and auxiliaries, which were blended at the designated quantities, act to cause the abovementioned coating material solution to melt the heat resistant material and the metal surface at the same time to thereby form a compound at the interface. This compound then becomes a stable compound at temperatures of 900°–1000° C.

The abovementioned potassium silicate is prepared as an aqueous solution and by mixing this with the powder material, the coating material is put into a solution form and made easier to coat onto the metal surface. The potassium silicate thus serves to make the coating material to comply with the form of the object treated and acts as a bonding agent until the powder material melts and coalesces with the metal at temperatures of 800°–900° C. and as an auxiliary for forming the compound of the powder material.

The abovementioned heat resistant materials, such as aluminum oxide and zirconium dioxide, are caused to melt at temperatures no higher than the melting point of the metal by the actions of the catalysts and auxiliaries to form a heat-resistant ceramic. At the same time, the abovementioned heat resistant materials are melted and coalesced with the metal surface to form a metal-ceramic compound. It has been confirmed through demonstration tests that, with the heat resistant coating material formed in the above manner, separation, cracking, etc. of the coat does not occur at high temperatures or under rapid cooling conditions or when such conditions are repeated, since the differences in the thermal expansion coefficients of the metal and the ceramic are absorbed by the abovementioned metal-ceramic compound at high temperatures or under rapid cooling.

The prevention of separation, cracking, etc. of the coat at high temperatures or under rapid cooling by the abovementioned absorption of the differences in expansion coefficients has not been clarified theoretically. However, the following assumption may be made.

As the temperature rises during sintering, a metal-ceramic compound is formed at the interface between the molten ceramic and the molten surface of the metal. At this time, numerous needle-like ceramic columns intrude into the metal to bind the metal with the coating material and inorganic materials with different particles sizes form a porous, stonewall-like condition. It is considered that the differences in expansion coefficients are absorbed and the expansion of the metal is followed up by such conditions.

Various tests have also proven that oxidation does not occur at the interface of the treated object despite the coat being in a porous condition. This may be because the materials serving as catalysts and the treated object, at the interface, form a compound that is extremely difficult to oxidize.

By coating the coating material with the above composition on the surface of a metal such as iron material, stainless steel material, etc. by the abovementioned coating process, the heat resistance temperature of the metal may be raised and the oxidation of the metal may be prevented.

For example, although an incinerator made of stainless steel is usually used at an incineration temperature of 800° C., stricter gas emission standards can be cleared if the incineration temperature is raised to 1000° C. Although stainless steel cannot cope with such a temperature, by applying the heat and oxidation resistant coat with the above composition on an iron material and using such a coated iron material, the heat resistance may be improved and oxidation may be prevented, thereby leading to reductions in raw material and processing costs.

Also, in thermoelectric power plants, steam at a temperature of about 900° C. is discharged from a furnace and then cooled to about 400° C. and passed through a heat exchanger. This is done despite there being much heat loss, because in presently used heat exchangers, the metal surface is finished with enamel and thus cannot cope with high temperatures. By coating the metal surface of the heat exchanger with heat and oxidation resistant coating materials of the abovementioned embodiments, high temperature steam may be received by the heat exchanger and circulated in the furnace to improve the thermal efficiency and greatly reduce fuel costs.

The fifth and sixth embodiments of the present invention shall now be described.

Tables 5 and 6 show blending ratios of the materials comprising the heat and oxidation resistant coating material of the fifth and sixth embodiments of the present invention. These embodiments are exemplary compositions for forming a heat and oxidation resistant coating material on the surface of firebricks (object to be treated or the object) for preventing degradation at the surface and joint parts.

In boilers, incinerators, annealing furnaces, etc. made with firebricks, the joint parts where the bricks are joined to each other become powderized by the repeated raising and lowering of temperature, and cracks, crumbling, etc. tend to occur relatively frequently. The destruction of the surface of firebricks and the powderization at the joints can be prevented by coating the surface of firebricks with the heat and oxidation resistant coating material, for which the blending ratios are shown in Tables 5 or 6.

TABLE 5

| Name of Material (Chemical Symbol) | Form | Blending Ratio | Mixing Ratio |
|---|---|---|---|
| Ferrosilicon (FeSi$_2$) | Powder | 30% | 40% |
| Manganese dioxide (MnO$_2$) | " | 15% | |
| Aluminum oxide (Al$_2$O$_3$) | " | 20% | |
| Zirconium dioxide (ZrO$_2$) | " | 5% | |
| Silica (SiO$_2$) | " | 18% | |
| Kaolinite (Al$_2$O$_3$2SiO$_2$2H$_2$O) | " | 5% | |
| Titanium dioxide (TiO$_2$) | " | 5% | |
| Heat resistant glass | " | 1% | |
| Graphite . . . JISR7201-72 | " | 1% | |
| | | 100% | |
| Potassium silicate (K$_2$SiO$_2$) | Liquid | 28 heavy Baume degree solution | 60% |

TABLE 6

| Name of Material (Chemical Symbol) | Form | Blending Ratio | Mixing Ratio |
|---|---|---|---|
| Ferrosilicon (FeSi$_3$) | Powder | 30% | 40% |
| Aluminum oxide (Al$_2$O$_3$) | " | 20% | |
| Zirconium dioxide (ZrO$_2$) | " | 5% | |
| Manganese dioxide (MnO$_2$) | " | 20% | |
| Silica (SiO$_2$) | " | 10% | |
| Kaolinite (Al$_2$O$_3$2SiO$_2$2H$_2$O) | " | 10% | |
| Borosilicate glass powder (B$_2$O$_3$—SiO$_2$) | " | 4% | |
| Graphite . . . JISR7201-72 | " | 1% | |
| | | 100% | |
| Potassium silicate (K$_2$SiO$_2$) | Liquid | 28 heavy Baume degree solution | 60% |

The powder materials shown in the Tables above are blended at their respective blending ratios and then mixed with a 28 heavy Baume degree aqueous solution of potassium silicate at a powder material to liquid material ratio of 40% to 60% to be thus prepared as a coating material solution. This coating material solution is applied on the surface of the firebrick by such means as brush application, spray application, immersion, etc. and sintered at temperatures no higher than the melting point of the firebrick.

Upon being sintered, the abovementioned coating material solution forms a glass-like ceramic compound coat on the surface of the firebrick. A large amount of ferrosilicon is blended in order to form this glass-like coat effectively.

The heat and oxidation resistant coating material for firebricks with the above composition is designed to soften at a temperature lower than the melting point (approx. 1200° C.) of the firebrick and forms a glass-like ceramic compound at the surface of the firebrick to prevent the powderization of the surface and the joint parts. For the heat and oxidation resistant coating material for firebricks, baking can be carried out simply by raising the temperature of a furnace made of firebricks. Thus, when partial damage, such as separation, has occurred, baking can be accomplished automatically by applying a top coat and firing up the furnace subsequently. This coating thus presents the benefits of easier maintenance. Furthermore, since the coating copes with rapid changes in temperature, it becomes possible to lower the temperature of the furnace forcibly to take out ashes from the incinerator or to take out products from an annealing furnace, etc. to thereby improve the operation rate considerably.

The seventh and eighth embodiments of the present invention shall now be described.

Tables 7 and 8 show mixing ratios of the materials comprising the heat and oxidation resistant coating of the seventh and eighth embodiments of the present invention. These embodiments are exemplary compositions for forming a heat and oxidation resistant coating material on the surface of molded carbon products for preventing thermal oxidation and improving wearing properties.

The abovementioned molded carbon products have been developed as C—C composites, carbon tiles, etc. and are utilized as parts for airplanes, automobiles, etc. However, in many cases, these materials inevitably suffer weight loss due to thermal oxidation and because of this, the thickness must be increased upon calculating the amount of weight loss and parts made by these materials must be changed often. The resistance to oxidation may be improved by coating the surface of the molded carbon product with the heat and oxidation resistant coating materials prepared with the blending ratios shown in FIGS. 7 and 8.

TABLE 7

| Name of Material (Chemical Symbol) | Form | Blending Ratio | Mixing Ratio |
|---|---|---|---|
| Ferrosilicon (FeSi$_3$) | Powder | 25% | 40% |
| Aluminum oxide (Al$_2$O$_3$) | " | 20% | |
| Silica (SiO$_2$) | " | 10% | |
| Zirconium dioxide (ZrO$_2$) | " | 5% | |
| Kaolinite (Al$_2$O$_3$2SiO$_2$2H$_2$O) | " | 5% | |
| Titanium dioxide (TiO$_2$) | " | 5% | |
| Cobaltous oxide (CoO) | " | 15% | |
| Manganese dioxide (MnO$_2$) | " | 10% | |
| Sodium tetraborate (Na$_2$B$_4$O$_7$) | " | 2% | |
| Heat resistant glass | " | 2% | |
| Graphite . . . JISR7201-72 | " | 1% | |
| | | 100% | |
| Potassium silicate (K$_2$SiO$_2$) | Liquid | 25–26 heavy Baume degree solution | 60% |

TABLE 8

| Name of Material (Chemical Symbol) | Form | Blending Ratio | Mixing Ratio |
|---|---|---|---|
| Ferrosilicon (FeSi$_3$) | Powder | 25% | 40% |
| Aluminum oxide (Al$_2$O$_3$) | " | 20% | |
| Silica (SiO$_2$) | " | 10% | |
| Zirconium dioxide (ZrO$_2$) | " | 5% | |
| Kaolinite (Al$_2$O$_3$2SiO$_2$2H$_2$O) | " | 5% | |
| Titanium dioxide (TiO$_2$) | " | 5% | |
| Aluminum silicate (Al$_2$O$_3$3SiO$_3$) | " | 5% | |
| Sodium borate (Na$_2$B$_4$O$_7$10H$_2$O) | " | 2% | |
| Manganese dioxide (MnO$_2$) | " | 10% | |
| Tricobalt tetroxide (Co$_3$O$_4$) | " | 5 | |
| Zinc oxide (Zin) | " | 2% | |
| Borosilicate glass powder (B$_2$O$_3$—SiO$_2$) | " | 5% | |
| Graphite . . . JISR7201-72 | " | 1% | |
| | | 100% | |
| Potassium silicate (K$_2$SiO$_2$) | Liquid | 25–26 heavy Baume degree solution | 60% |

The powder materials shown in the Tables above are mixed at their respective blending ratios and are mixed with a 25–26 heavy Baume degree aqueous solution of potassium silicate at a powder material to liquid material ratio of 40% to 60% to be thus prepared as the coating material solution. This coating material solution is applied on the surface of the molded carbon product by such means as brush application, spray application, immersion, etc. and sintered at temperatures of 900°–100° C.

The abovementioned molded carbon products are extremely poor in bonding properties and it has been deemed that the forming of a ceramic coat on the carbon would be impossible. However, as was mentioned in the embodiment wherein a coat is formed on a metal surface, needle-like ceramic columns intrude within the carbon to enable a coat to be formed on a carbon surface with poor bonding properties.

The comprising materials and the blending ratios shown in Tables 1–8 for the abovementioned embodiments of heat and oxidation resistant coating materials are standard compositions. Heat and oxidation resistant materials, which match the object to be treated and its applications, are formulated by adding, altering, or removing the materials or altering the blending ratio, pretreatment prior to blending, particle form, etc. according to the object.

As was described above, in the present invention, by blending high melting point materials, such as zirconium dioxide, aluminum oxide, magnesium oxide, etc. with auxiliaries which serve as catalysts and act to form compounds, the high melting point materials are made to melt at temperatures no higher than the melting point of the objects to be treated and a heat resistant coat is formed on the surface of the object. Furthermore, the coating material is made to accommodate for the thermal expansion of the object and a coat which acts to prevent oxidation is formed. Since the heat and oxidation resistant coating material is applied to the object by coating the coating material, which is put into solution form, onto the surface of the object and baking the coating material on at temperatures no higher than the melting point of the object, much freedom is provided in complying with the shape of the object, the degradation and thermal oxidation of firebricks, carbon, etc. are restricted, and a heat resistant coating which does not separate or crack is formed on metal surfaces.

What is claimed is:

1. In a method of coating a heat and oxidation resistant material onto an object, wherein said material comprises aluminum oxide, zirconium dioxide, silica, kaolinite, graphite and potassium silicate, the improvement comprising:

coating said material in an aqueous media onto said object and sintering at a temperature lower than the melting point of said object, wherein the sintering temperature of said material is reduced by admixture into the aqueous media of a modifier selected from the group consisting of ferrosilicon, titanium dioxide, manganese dioxide, tricobalt tetroxide, cobaltous oxide, cobaltic oxide and Raney cobalt.

2. The method of claim 1, wherein the aqueous media is prepared by a process comprising mixing:

(A) 30 to 40% of a powder phase comprising the aluminum oxide, zirconium dioxide, silica, kaolinite, graphite and the modifier; and (B) 60 to 70% of a liquid phase comprising the potassium silicate and water.

3. The method of claim 2, wherein the powder phase further comprises a compound selected from the group consisting of zinc oxide, zinc hydroxide, zinc carbonate, lead sesquioxide and lead silicate.

4. The method of claim 3, wherein the powder phase comprises zinc oxide.

5. The method of claim 2, wherein the powder phase further comprises a compound selected from the group consisting of sodium borate, sodium metaborate, sodium pyroborate, sodium tetraborate, boron trioxide, sodium pentaborate and ammonium borate.

6. The method of claim 2, wherein the powder phase further comprises a compound selected from the group consisting of magnesium oxide, magnesium borate, magnesium sulfate and magnesium fluoride.

7. The method of claim 1, wherein the aqueous media further comprises a compound selected from the group consisting of zinc oxide, zinc hydroxide, zinc carbonate, lead sesquioxide and lead silicate.

8. The method of claim 7, wherein the aqueous media comprises zinc oxide.

9. The method of claim 1, wherein the aqueous media further comprises a compound selected from the group consisting of sodium borate, sodium metaborate, sodium pyroborate, sodium tetraborate, boron trioxide, sodium pentaborate and ammonium borate.

10. The method of claim 1, wherein the aqueous media further comprises a compound selected from the group consisting of magnesium oxide, magnesium borate, magnesium sulfate and magnesium fluoride.

11. In a method of coating a heat and oxidation resistant material onto an object, wherein said material comprises aluminum oxide, zirconium dioxide, silica, kaolinite, graphite and potassium silicate, the improvement comprising:

coating said material in an aqueous media onto said object and sintering at a temperature lower than the melting point of said object, wherein the sintering temperature of said material is reduced by admixture into said aqueous media of a modifier selected from the group consisting of ferrosilicon, titanium dioxide, manganese dioxide, tricobalt tetroxide, cobaltous oxide, cobaltic oxide and Raney cobalt, and the oxidation resistance of said material is enhanced by admixture into said aqueous media of a compound selected from the group consisting of zinc oxide, zinc hydroxide, zinc carbonate, lead sesquioxide and lead silicate.

12. The method of claim 11, wherein the aqueous media comprises zinc oxide.

* * * * *